Oct. 4, 1932.   A. N. BENN   1,880,679
METHOD AND APPARATUS FOR SHAPING MEAT
Filed Oct. 20, 1930   3 Sheets-Sheet 1
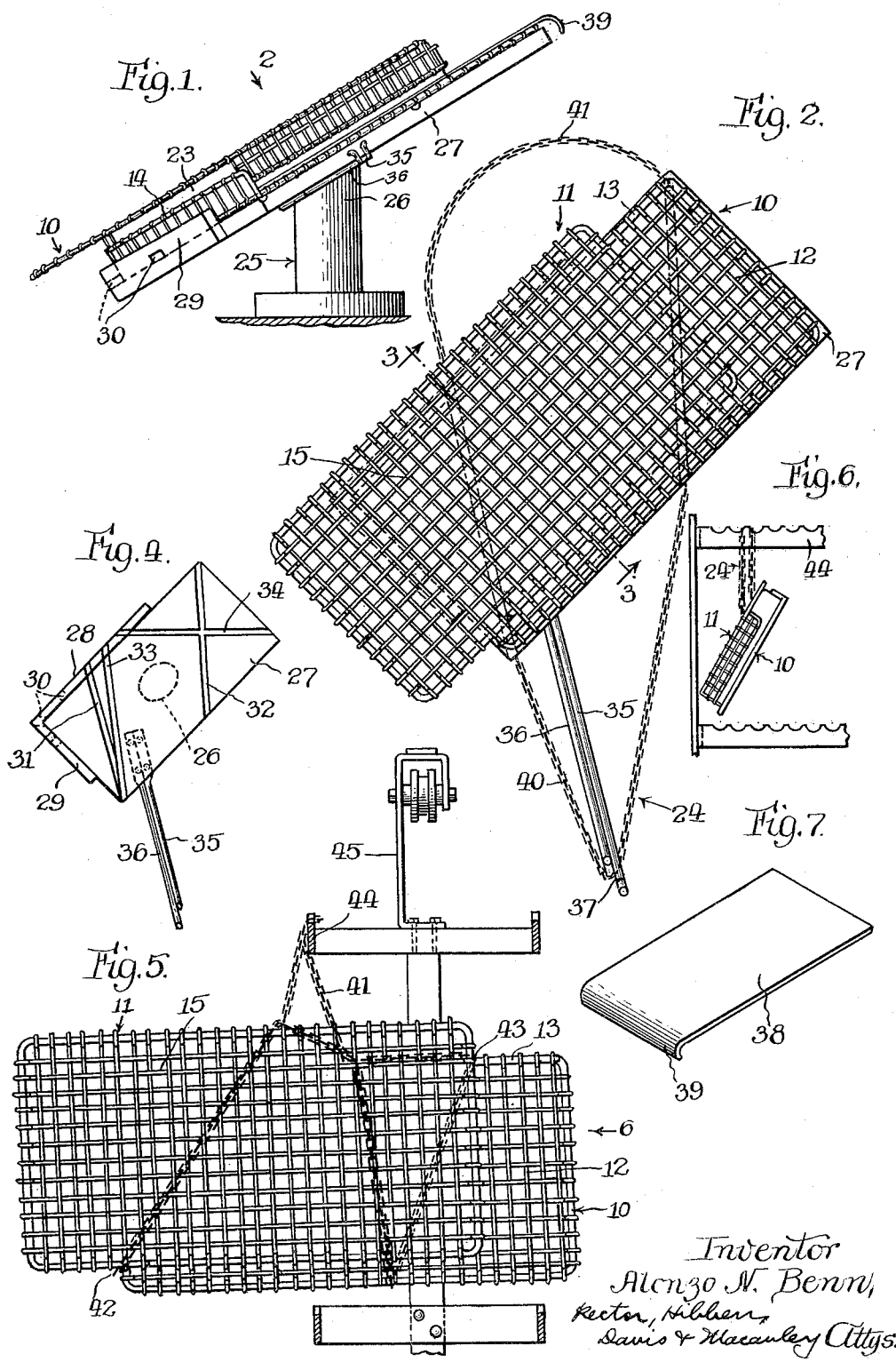

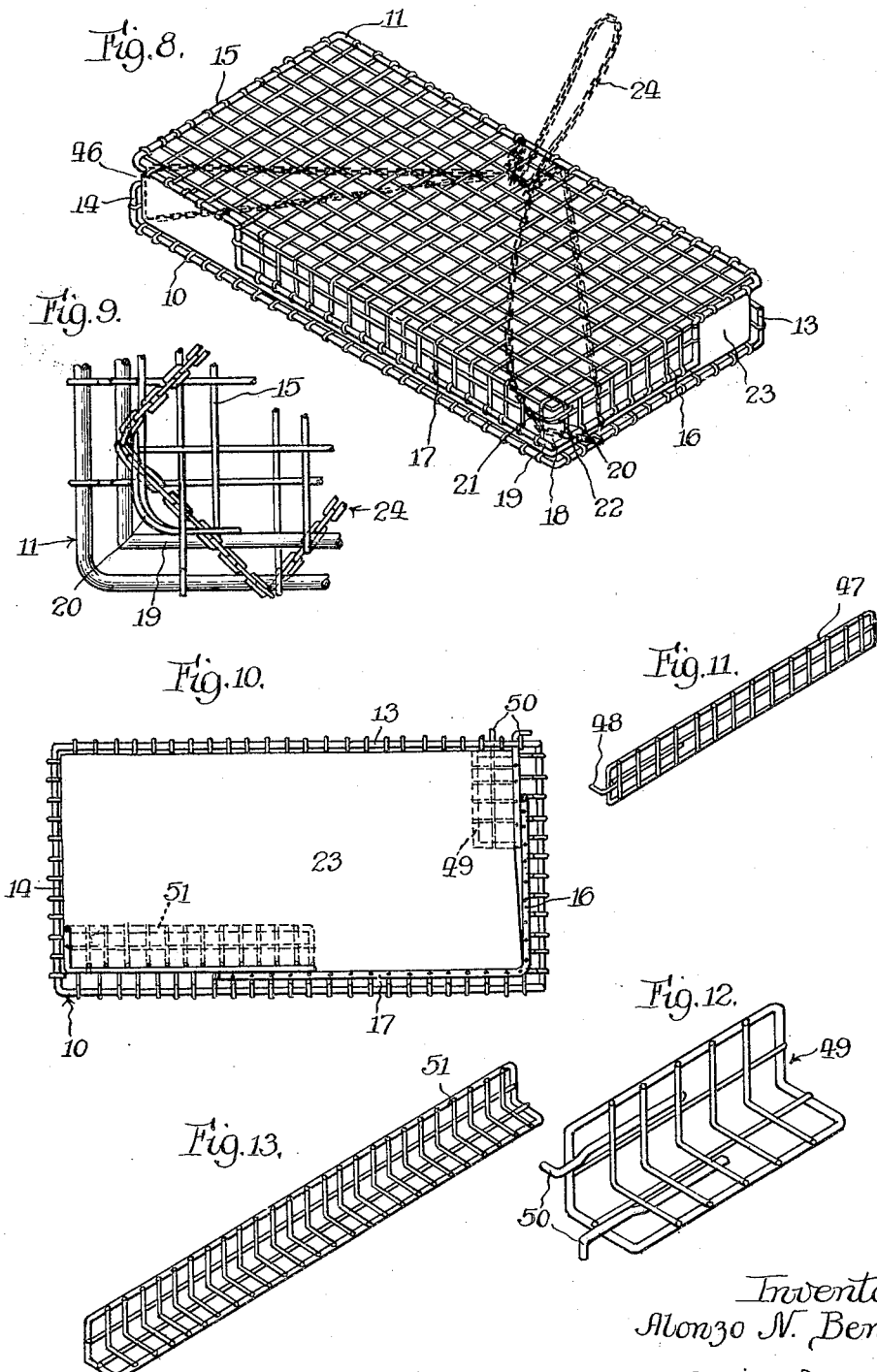

Oct. 4, 1932.  A. N. BENN  1,880,679
METHOD AND APPARATUS FOR SHAPING MEAT
Filed Oct. 20, 1930  3 Sheets-Sheet 3
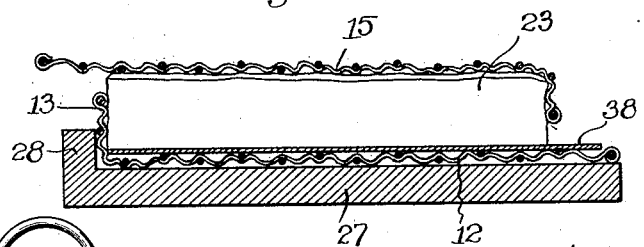
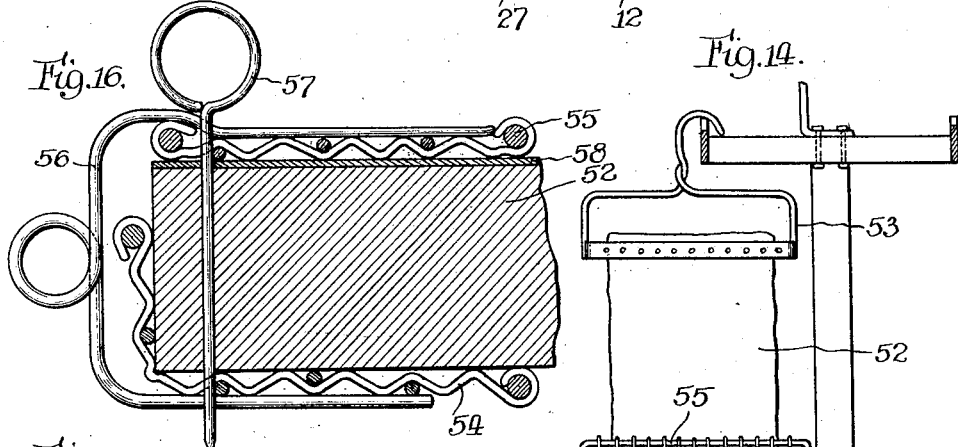
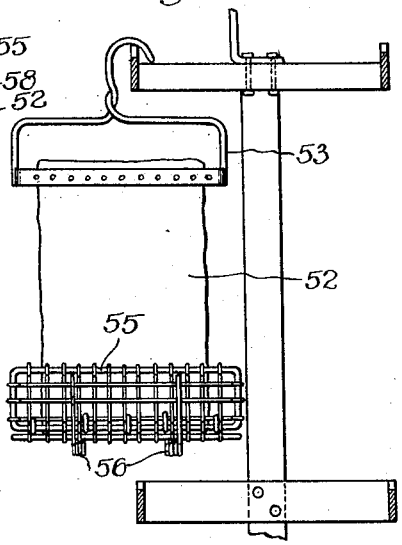
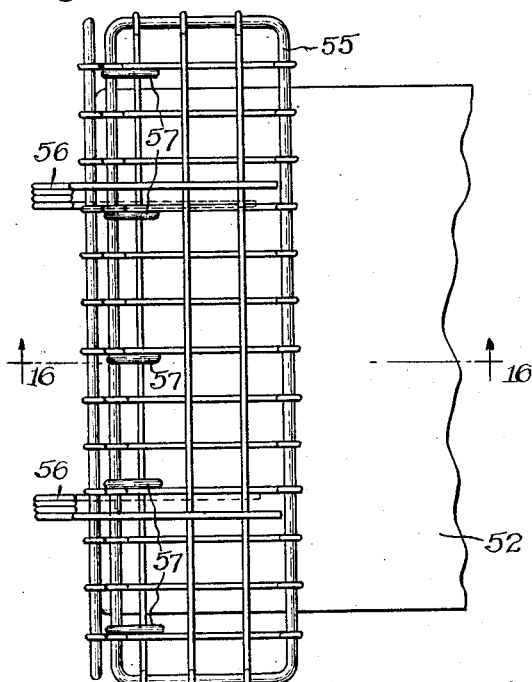
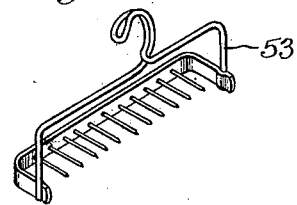
Inventor:
Alonzo N. Benn,
Rector, Hibben, Davis & Macaulay
Attys.

Patented Oct. 4, 1932

1,880,679

UNITED STATES PATENT OFFICE

ALONZO N. BENN, OF CHICAGO, ILLINOIS

METHOD AND APPARATUS FOR SHAPING MEAT

Application filed October 20, 1930. Serial No. 489,869.

My invention relates to a method and apparatus for shaping meat and is concerned more particularly with the initial shaping and maintenance thereof of belly or bacon pieces or strips during the smoking operation, although the principal conception involved is readily adaptable to other classes of meat.

One object of my invention is to devise a method of shaping meat in which the necessary pressure is established and maintained through special types of devices which are subject to the action of gravity as well as applied pressure.

A further object is to devise a method of the character described in which the bacon strip is substantially enclosed between a pair of relatively movable, cage members which are suspended from a hook during the smoking operation, the nature of the suspension and the capacity of the cage members for relative movement creating the desired shaping pressure on the bacon strip for the purpose of squaring the ends and sides thereof.

A further object is to provide cage members for effectuating the above noted method, which possess complementary shaped formations and which, when in operative relation to each other, form substantially a box within which is disposed the bacon strip, the side and end walls of one of the cage members being shortened relative to the corresponding members of the other cage member, whereby the cage members are capacitated for relative movement.

A further object is to devise an apparatus which is intended more particularly for use in connection with those bacon strips which possess loose skin folds adjacent one end thereof, the apparatus being particularly designed and adapted to flatten and press these loose folds and to maintain this condition during the smoking operation, so that the skin is effectually restrained from any relative shrinking movement during the smoking operation with respect to the meat and fatty portions.

A further object is to provide an apparatus of either of the foregoing types which includes simple, highly effective, and easily positioned devices for initially constraining the meat into the form desired, particularly a squaring of the ends and sides and a thickening of thin pieces, and maintaining the indicated shape during the smoking operation, and which is further arranged to permit an intimate contact of the smoke and hot gases with the whole exterior of the meat.

The present invention is intended to overcome the disadvantages now inherent in smoked bacon, or other classes of meats generally, respecting misshapen and ill-shaped ends and sides which are not only highly productive of waste in slicing the same, but which lessen the attractiveness of the meat and therefore affect its marketability. Meats of this character are simply hung from a suitable stick or the rail of a smokehouse trolley, the actual supporting member being in the nature of hooks which are forced bodily through the meat. This manner of suspension creates holes which become elongated under the action of gravity according to different degrees with consequent distortion in the shape of the meat and the creation of an irregular outline thereof, allowing uneven contraction and displacement to take place between the fatty and lean portions of the meat. In addition to the misshapen appearance of bacon smoked under these conditions, the holes created by the hooks become scarred and blackened, so that this end of the meat requires considerable trimming before it can be placed in a marketable condition. Finally, relatively thin, or less than prime pieces of bacon, when simply suspended from the usual comb hanger, exhibit a tendency to lengthen and to therefore become thinner and less desirable for slicing.

The foregoing economic waste is avoided according to the practice of my invention, as well as the hap-hazard method of handling the bacon in order to achieve the desired shape thereof. The employment of my improved method and the structure for effectuating the same permits a positive, controlled initial shaping of the comparatively soft and pliable pieces of meat as well as an actual thickening of pieces which may be less than prime, prior to smoking and the subsequent holding of the shape during the latter process, so that the general appearance and shape of the bacon is greatly improved with consequent advantages from the standpoint of marketability. This initial shaping of the meat is attained by the use of devices which are susceptible of easy and rapid positioning and specifically comprise a pair of complementary shaped, cage members which, when in operative position, present a substantially boxed formation, with an endless chain passed around the total assembly to form a slip loop, the free portion of this loop then being hung from the rail of a smokehouse trolley or some other convenient member. These cage members are arranged for relative movement so that, under the action of gravity, they exercise, in conjunction with the encircling chain, a sufficient pressure on the bacon strip to adequately square the ends and sides thereof without buckling of the intermediate portion of the strip. Special fixtures are employed to facilitate the assembly of the cage members and the chain, prior to their mounting on the trolley.

Another aspect of my invention contemplates the provision of an apparatus for use in connection with those kinds of bacon strips which have loose, skin folds adjacent one end thereof. Special devices are provided for flattening and straightening these skin folds and for maintaining this condition during the smoking operation, while at the same time substantially squaring the ends thereof.

These and further objects of my invention will be set forth in the following specification, reference being had to the accompanying drawings, and the novel means by which said objects are effectuated will be definitely pointed out in the claims.

In the drawings:

Figure 1 is a side elevation of my improved fixture, showing the manner of mounting the cage members thereon during the initial assembly of these parts and the bacon strip, the endless chain member being omitted.

Fig. 2 is an enlarged plan view of the parts shown in Fig. 1, looking in the direction of the arrow 2 in said figure and showing the relation of the endless chain to the cage members prior to forming the slip loop therearound.

Fig. 3 is a cross section on the line 3—3 of Fig. 2, looking in the direction of the arrows.

Fig. 4 is a plan view of the fixture shown in Fig. 1 on a reduced scale and particularly illustrating the grooves formed in the base thereof for receiving the endless chain, as well as the measuring arm for determining the initial position of the chain.

Fig. 5 is a side elevation of the apparatus when occupying a suspended position on a smokehouse trolley, the shifted relation of the cage members indicating the carriage of a bacon strip which is smaller than the base of either member.

Fig. 6 is an end view of the apparatus shown in Fig. 5 looking in the direction of the arrow 6 in said figure, and illustrating the canted position which the apparatus assumes during the smoking operation.

Fig. 7 is a perspective view of an auxiliary shield device which may be employed during the positioning of the soft, pliable bacon strip between the cage members.

Fig. 8 is a perspective view of the apparatus showing the cage member enclosing a bacon strip having dimensions substantially equal to those of the cage members and with the endless chain occupying a different looping position from that shown in Fig. 5, owing to the different relative positions of the cage members.

Fig. 9 is an enlarged plan view of the lowermost corner of the apparatus, as viewed in Fig. 8, and illustrating the manner in which the chain is looped around the indicated corner.

Fig. 10 is a plan view of the apparatus, as viewed in Fig. 8, the base portion of the upper cage member being omitted, and showing the auxiliary cage inserts which may be employed to close the gaps caused by the short end and side walls of the upper member.

Figs. 11, 12 and 13 are perspective views illustrating different forms of the auxiliary cage inserts.

Fig. 14 is an elevation taken in transverse section through a smokehouse trolley and showing the manner of suspending a bacon strip therefrom, which is characterized by loose skin folds adjacent the lower end of the strip.

Fig. 15 is an enlarged view of the apparatus employed on the lower end of the strip, as viewed in Fig. 14, the view being turned through an angle of 90° for convenience.

Fig. 16 is a section along the line 16—16 in Fig. 15, looking in the direction of the arrows, and showing the several elements comprising this modified form of apparatus.

Fig. 17 is a perspective view illustrating a standard form of bacon hook which may be employed in connection with the apparatus illustrated in Figs. 15 and 16.

Referring to Figs. 1 to 13, inclusive, my improved appartus comprises a pair of cooperating cage members 10 and 11, each of which is illustrated as having a generally rectangular outline but which may have any desired shape and which is preferably formed of wire screen or netting having any desired mesh and gauge of wire, but is usually formed of material of this character which will stand hard usage without distortion or loss of shape. The use of wire screening, or any generally foraminous material, insures that the meat supported by the cage members will be effectively subjected to the action of the heat when smoked during the smoking process.

The member 10 comprises a base 12 which is provided with an upstanding side wall 13 and an upstanding end wall 14 (see Fig. 8), both of these walls preferably extending for the full length of the indicated sides of the base 12. The cage member 11 is intended to cooperate with the member 10 as a complementary unit therefor and comprises a base 15 which is provided with an end wall 16 and a side wall 17 (see Fig. 8). For a purpose hereinafter explained, the walls 16 and 17 have a shorter length than the walls 14 and 13, respectively. The interlaced wires forming the cage member 11 are so arranged that one of these wires does not occur at the junction of the walls 16 and 17, thereby providing a notch 18 for a purpose hereinafter explained, said notch being defined by the adjacent portion of the marginal wire 19, a body wire 200 which is parallel to the wire 19 and the body wires 21 and 22 which, respectively, form parts of the walls 17 and 16.

The manner of supporting a piece of bacon 23 between the cage members 10 and 11 is illustrated generally in Fig. 8, in which it will be noted that the bacon 23 rests upon the member 10, with the member 11 placed in overlying position so that the walls 16 and 17 depend from the base 15 of the member 11 to contact with the adjacent side and end faces of the bacon, the opposite corresponding sides of the bacon being contacted by the walls 13 and 14 of the member 10. Bound around this assembly of cage members and bacon is an endless chain 24 whose manner of application and subsequent use will now be described.

As a means of facilitating the assembly noted above, it is contemplated that the improved type of fixture 25, as shown in Figs. 1 and 4, will be employed. This fixture comprises a pedestal 26 which carries on the upper end thereof a base 27 which is preferably inclined to the horizontal in order to facilitate operations and permit the drainage of the excess pickling solution when the soft pieces of bacon are placed thereon. The lower side and end of the base 27 is provided with upstanding walls 28 and 29, respectively, each of which may be provided with holes 30 for draining. The walls 28 and 29 function essentially as guiding or stop members and are normally disposed to the plane of the base 27. Companion grooves 31 and 32 extend across the upper side of the base 27 in approximately the angular relation shown, the grooves 31 also being cut across the wall 28, and a second set of companion grooves 33 and 34 is also provided in the same base, both of the last named grooves extending across the wall 28. The foregoing respective sets of grooves are intended to receive portions of the endless chain 24 during the assembly steps of my improved method, the selection as to the pair of grooves utilized being dependent upon the size of the piece of bacon as will become more apparent hereinafter. Extending from that side of the base 27 which is opposite to the wall 28 are arms 35 and 36 which are preferably arranged close to each other for the major portion of their lengths, the arm 35 being shorter than the arm 36 and both arms being turned upwardly at their ends, the relative length of said arms defining a notch 37 which is employed for a purpose hereinafter explained.

In carrying out my improved method, the closed length of chain 24 will be placed with portions of the loop thereof in the grooves 31 and 32, it being assumed that the bacon strip which is to be smoked is characterized by marginal dimensions less than the corresponding dimensions of either of the members 10 and 11. The chain 24 will be adjusted in said grooves by causing the chain to be passed through the notch 37, the remainder of the chain being pulled as tautly as possible in a direction away from said notch without causing the chain to ride out of the grooves 31 and 32, said chain occupying the position substantially as shown in Fig. 2. The arms 35 and 36 provide a convenient measuring device for correctly determining the initial position of the chain, dependent upon the size of the bacon, and obviate any necessity for a subsequent shifting and readjustment in order to correctly position the chain with reference to the cage members.

The cage member 10 is then placed upon the base 27 in overlying relation to the chain 24 and with the walls 13 and 14 contacting, respectively, with the walls 28 and 29. It is then contemplated that a shield member 38 will be placed upon the base 12 of the member 10 in order to provide a smooth surface along which the fleshy side of the bacon may be moved until a pair of its adjacent marginal edges contacts with the walls 13 and 14 of the member 10. After the latter position of the bacon has been achieved, the shield member 38 may be drawn by the operator by means of the finger grip 39. The cage member 11 is then placed over the bacon with the walls 16 and 17 contacting, respectively, with an end face and a side face of the bacon. Owing to the bacon being smaller than either of the cage members 10 and 11, it will be understood that the member 11 will require a shifting to place the same substantially in the position shown in Fig. 2, in order that the side and end faces of the bacon strips may be engaged by the corresponding side and end walls of the two cage members. This relative shifting position of the member 11 is, of course, made possible by the shorter length of the walls 16 and 17 thereof.

The cage members and meat having been placed in the positions indicated, the portion 40 of the chain 24, as shown in Fig. 2, will be disengaged from the notch 37 and placed in overlying relation to the cage member 11, whereupon the opposite, free portion 41 of said chain will be carried under the portion 40, the contacting points of said chain portions occurring adjacent the upper side of the member 11, as viewed in Fig. 2. This manner of binding the cage members on the bacon strip is essentially in the nature of a slip loop, so that when the entire assembly is suspended, as hereinafter described, the capacity of the cage members 10 and 11 for relative movement in conjunction with the slip nature of the loop enables a convenient and adequate pressure to be exerted upon the side and end walls of the bacon, the bases of the respective cage members preventing any tendency of the bacon strip to buckle. As shown in Fig. 5, one part of the chain portion 40 contacts with the lower edges of the cage members 10 and 11, while another part is effectually positioned in a corner 42 created by the relative positions of said members. At the top of said members, as also viewed in said figure, one part of the portion 41 is positioned in a corner 43 which is also formed by the relative, shifted position of said members, while another part of said portion, together with the portion 40 effectually contacts with the upper edge of the cage member 11. The free part of the chain portion 41 is utilized as the suspending means and may be supported from a rail 44 which is provided on the customary smokehouse trolley 45.

When suspended from said trolley, the cage members carrying the meat assume the generally canted position shown in Fig. 6 which is very effective from the standpoint of securing an intimate contact of the meat with the hot gases, it being understood that when the bacon strip is initially placed between the cage members, the skin side of the strip is placed upwardly, although the meat side may be placed upwardly if so desired. The smokehouse trolley will carry several superimposed rows of these cage members and, owing to the canted position of each in the trolley, it will be readily apparent that the ascending smoke and hot gases will be deflected by the inclined surfaces presented by the members and the bacon, thereby causing that periodic change in direction which is considered advantageous for smoking.

The foregoing relation of the chain 24 obtains under conditions in which the piece of bacon is smaller than the bases of the members 10 and 11. However, in handling a bacon strip which has substantially the same dimensions as the cage members, a different binding relation of the chain 24 is required. Under these conditions, the chain, instead of being placed in the grooves 31 and 32, will be placed in the grooves 33 and 34, so that when the portions 40 and 41 are passed around said members to form the above noted slip loop, the relation of the chain to the several cage members will be substantially as illustrated in Fig. 8, one part of the chain portion 40 being seated in the notch 46 defined by the adjacent parts of the wall 14 and the base 15, while another part of the same chain portion will be received within the notch 18 described above. Thereafter, the total assembly may be suspended from a smokehouse trolley as noted above. After either of the above-discussed chain relations have been established, either effectually retains the respective cage members in the positions noted, positively preventing any tendency of the cage members to become separated.

By referring to Fig. 8 it will be apparent that, when a piece of bacon is used which has substantially the same dimensions as the cage members, the short walls 16 and 17 leave portions of the bacon side or end walls unsupported and not subject to the shaping pressure desired. Under these conditions it is contemplated that one or more of the auxiliary cage inserts shown in Figs. 11 to 13, inclusive, will be employed. The member 47 is simply a flat member provided with a hook 48 at one end; the member 49 is L-shaped in cross section with each limb thereof provided at one end with a hook 50; in Fig. 13 is shown a still further modification of these inserts in which the numeral 51 represents a piece which is substantially the same as the insert 49, except that the former is not provided with hooks at the ends thereof. The question as to which of these inserts is to be employed is a matter of choice, those which are provided with hooks enabling the use of shorter inserts, since the hooked ends thereof are positively engaged with the wires forming the side or end wall of one of the cage members, as may be the case, whereas it is necessary to employ a longer insert, such as 51, where hooks are not required, since it is necessary to depend upon a relatively large surface engagement of the insert with one of the walls of the cage member 11 in order to retain the insert in position. The manner of using the inserts can be readily understood by referring to Fig. 10, in which two of the inserts are shown in position, these positions corresponding to the gaps caused by the short lengths of the walls 16 and 17.

The modified form of apparatus shown in Figs. 14 to 17, inclusive, is intended for use in connection with a piece of bacon 52 which may be characterized by loose, skin folds on one side thereof. It is contemplated that one end of such a piece of bacon will be pierced by the standard form of bacon hook, designated generically by the numeral 53, while at the opposite end thereof, the fleshy side of the strip will be received in a cage member 54 which is substantially L-shaped in cross section, with a flat cage member 55 contacting with the opposite or skin side of the strip (see Fig. 16). The members 54 and 55 will be made of the same kind of wire as comprise the cage members 10 and 11 and will be retained in position by a pair of spring clamps 56 whose arms overlie and contact with those portions of the cage members which engage the opposite sides of the bacon strips. Pins 57 are then driven through the cage members and through the thickness of the bacon strip, these pins in conjunction with the cage members serving to flatten loose parts of the skin 58, as well as to effectually resist any shrinkage tendencies of said skin relative to the meat and fatty portions which would otherwise cause an exposure of a portion of the latter to the smoke and hot gases.

Either of the above types of apparatus, when used as indicated, provide an effective means for initially squaring the ends of bacon strips and maintaining the bacon in that condition throughout the smoking operation. The finished product will therefore be superior to those pieces of bacon which are merely hung from a hook for exposure to the smoke. The apparatus first described enables the action of gravity to be utilized as a means for applying the shaping pressure desired, without requiring that the bacon strip be pierced with a number of holes.

While I have shown one set of elements and combinations thereof for effectuating my improved method and apparatus for shaping meat, it will be understood that the same is intended for purpose of illustration only and in no wise to restrict my apparatus to the exact forms and structures shown, for many changes may be made therein without departing from the spirit of my invention.

I claim:

1. The method of shaping meat for smoking which consists in placing the meat between members which are arranged for relative movement to exert a pressure on said meat and then suspending the assembly of meat and members for exposure to smoke and hot gases, the action of gravity through the capacity of said members for relative movement applying a shaping pressure to the meat.

2. The method of shaping meat for smoking which consists in placing the meat between members which are arranged for relative movement to exert a pressure on said meat, disposing a slip loop around the assembly of meat and members, and suspending the assembly by the free projecting portion of said loop, the action of gravity causing a tightening movement of said loop and the application of a shaping pressure to the meat.

3. The method of shaping meat for smoking which consists in placing the meat between members which are arranged to exert a pressure on said meat by relative movement and resting on a closed length of chain, passing said chain around the assembly of meat and members to form a slip loop, and suspending the assembly by the free projecting portion of said loop, the action of gravity causing a tightening movement of said loop and the application of a shaping pressure to the meat.

4. An apparatus for shaping meat for smoking comprising a pair of cooperating, relatively movable cage members arranged to receive the meat therebetween, and means for suspending the assembly of meat and members for exposure to the smoke and hot gases, said means being adapted to employ a shaping pressure to said meat through said members under the action of gravity.

5. An apparatus for shaping meat for smoking comprising a pair of cooperating, relatively movable cage members arranged to receive the meat therebetween, and means for suspending the assembly of meat and members for exposure to the smoke and hot gases, comprising a slip loop around said members with the free portion of the loop engaging a hook for suspension, the action of gravity exerting a shaping pressure on said meat due to the capacity of said members for movement.

6. An apparatus for shaping meat for smoking comprising a pair of cooperating, relatively movable cage members arranged to receive the meat therebetween, and means for suspending the assembly of meat and members for exposure to the smoke and hot gases, comprising an endless chain bound around said members to form a slip loop with the free portion of the loop engaging a hook for suspension, the action of gravity exerting a shaping pressure on said meat due to the capacity of said members for movement.

7. An apparatus for shaping meat for smoking comprising a cage member having a base, a side and an end wall, a second cage member having a base, a side and an end wall, said last-named walls being shorter than the corresponding walls of said first member, and said members being disposed in substantially box-forming relation to receive a piece of meat therebetween, the arrangement of wall lengths permitting relative shifting movement of said members, and means for suspending the assembly of meat and members for exposure to the smoke and hot gases, comprising a slip loop around said members with the free portion of the loop engaging a hook for suspension, the action of gravity exerting a shaping pressure on said meat due to the capacity of said members for movement.

8. An apparatus for shaping meat for smoking comprising a cage member having a base, a side and an end wall, a second cage member having a base, a side and an end wall, said last-named walls being shorter than the corresponding walls of said first member and said members being disposed in substantially box-forming relation to receive a piece of meat therebetween, the arrangement of wall lengths permitting relative shifting movement of said members, foraminous inserts for closing the gaps established by the short walls, and means for suspending the assembly of meat and members for exposure to the smoke and hot gases, comprising a slip loop around said members with the free portion of the loop engaging a hook for suspension, the action of gravity exerting a shaping pressure on said meat due to the capacity of said members for movement.

In testimony whereof, I have subscribed my name.

ALONZO N. BENN.